US009505390B2

(12) United States Patent
Richard et al.

(10) Patent No.: US 9,505,390 B2
(45) Date of Patent: Nov. 29, 2016

(54) BRAKE ASSIST DEVICE AND MOTOR VEHICLE COMPRISING SUCH A DEVICE

(75) Inventors: Philippe Richard, Chelles (FR);
Francois Gaffe, La Turballe (FR);
Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 594 days.

(21) Appl. No.: 13/993,789

(22) PCT Filed: Dec. 12, 2011

(86) PCT No.: PCT/EP2011/072422
§ 371 (c)(1),
(2), (4) Date: Oct. 30, 2013

(87) PCT Pub. No.: WO2012/080157
PCT Pub. Date: Jun. 21, 2012

(65) Prior Publication Data
US 2014/0041378 A1    Feb. 13, 2014

(30) Foreign Application Priority Data

Dec. 15, 2010 (FR) .................................... 10 04900

(51) Int. Cl.
*B60T 13/68*    (2006.01)
*B60T 13/74*    (2006.01)

(52) U.S. Cl.
CPC ............ *B60T 13/686* (2013.01); *B60T 13/745* (2013.01)

(58) Field of Classification Search
CPC ............................... B60T 13/745; B60T 7/042
USPC ........................................................ 60/545
See application file for complete search history.

(56) References Cited

U.S. PATENT DOCUMENTS

| 6,253,635 | B1 * | 7/2001 | Huber | B60T 7/042 267/158 |
|---|---|---|---|---|
| 6,315,371 | B1 * | 11/2001 | Wachi | B60T 7/042 303/11 |
| 2004/0232761 | A1 * | 11/2004 | Richard | B60T 13/57 303/10 |
| 2005/0211519 | A1 * | 9/2005 | Maligne | B60T 13/575 188/356 |
| 2007/0199436 | A1 * | 8/2007 | Ikeda | B60T 13/746 91/376 R |

(Continued)

FOREIGN PATENT DOCUMENTS

| CN | 1895940 | 1/2007 |
|---|---|---|
| EP | 1964739 | 9/2008 |

(Continued)

*Primary Examiner* — John K Fristoe, Jr.
*Assistant Examiner* — Matthew Wiblin
(74) *Attorney, Agent, or Firm* — Norton Rose Fulbright US LLP; Gerard Messina

(57) ABSTRACT

A brake-assist device for a motor vehicle having a servomotor is described. A servomotor has a plunger piston, a moving part, and an arrangement to move the moving part into position with respect to the plunger piston. The servomotor is actuated by a control rod. The control rod has a first end that presses upon the plunger piston and a second end to receive a force exerted by a brake pedal intended to be moved by a driver of the vehicle. The servomotor includes a sensor interposed in a contact space between the plunger piston and the moving part. A spring is compressed between the plunger piston and the moving part. The servomotor includes an arrangement for displacing the plunger piston in the contact space based on the driving mode. A stiffness of the spring is sufficiently high for an onset of braking to occur only with a striking force that is significantly higher during a reactive driving mode than it is during a calm driving mode.

17 Claims, 5 Drawing Sheets

(56) References Cited

U.S. PATENT DOCUMENTS

| | | | |
|---|---|---|---|
| 2008/0230328 A1* | 9/2008 | Lacroix | B60T 11/16 188/1.11 E |
| 2008/0231109 A1* | 9/2008 | Yamada | B60T 8/3265 303/20 |
| 2011/0146395 A1* | 6/2011 | Vollert | B60T 7/042 73/132 |
| 2011/0178687 A1* | 7/2011 | Anderson | B60T 13/745 701/70 |
| 2011/0297493 A1* | 12/2011 | Vollert | B60T 7/042 188/106 R |
| 2012/0023927 A1* | 2/2012 | Klimes | B60T 7/042 60/552 |

FOREIGN PATENT DOCUMENTS

| | | |
|---|---|---|
| JP | 2012-512780 | 6/2012 |
| WO | WO 2010/006996 | 1/2010 |
| WO | WO 2010/069740 | 6/2010 |

* cited by examiner

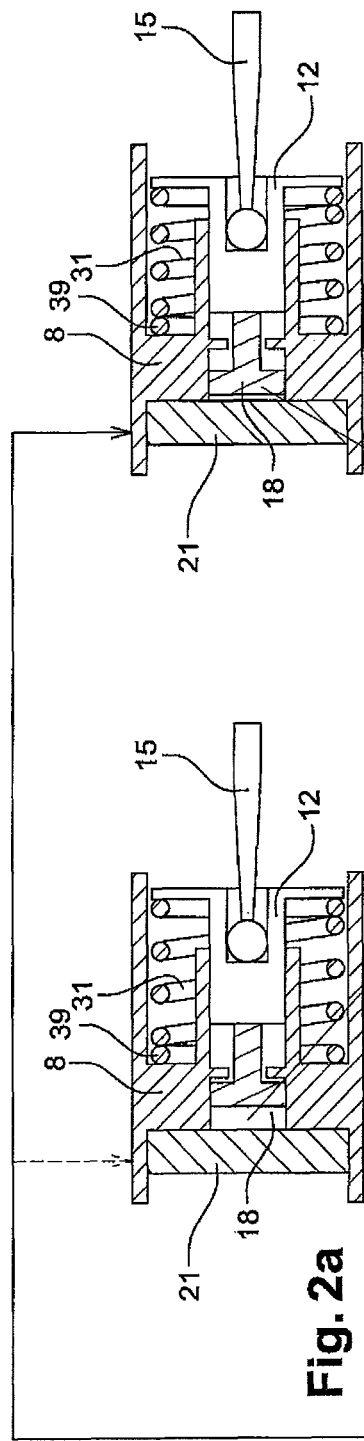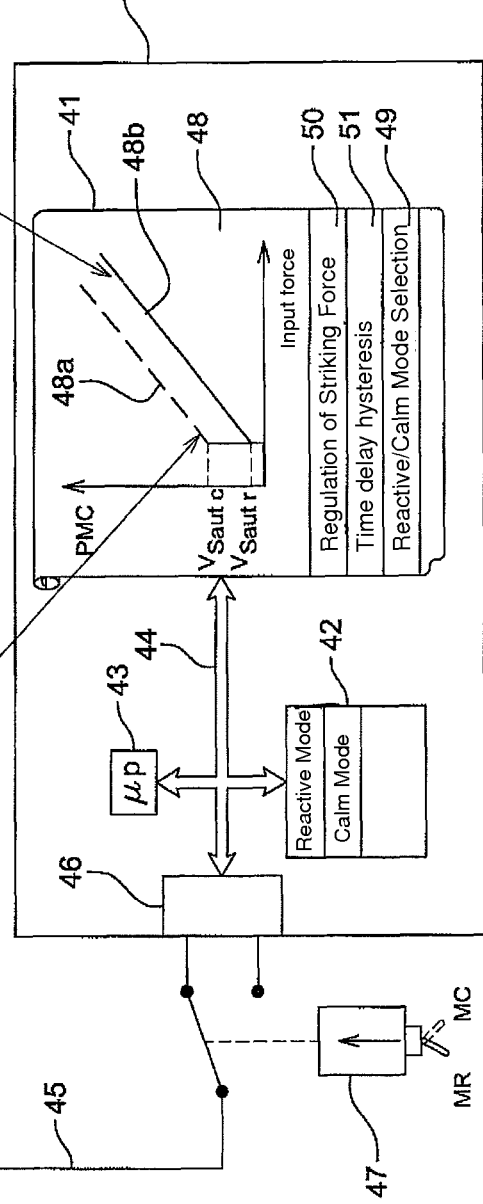

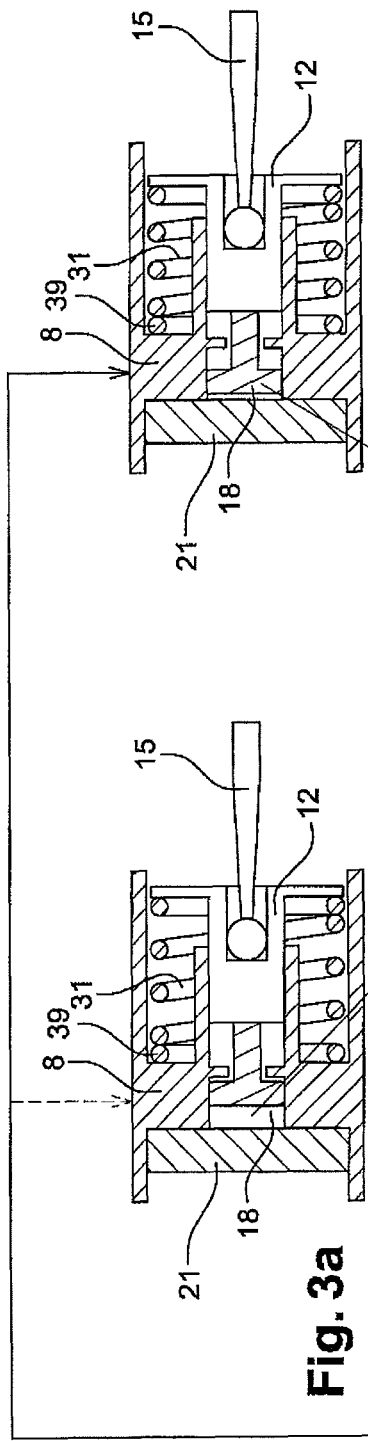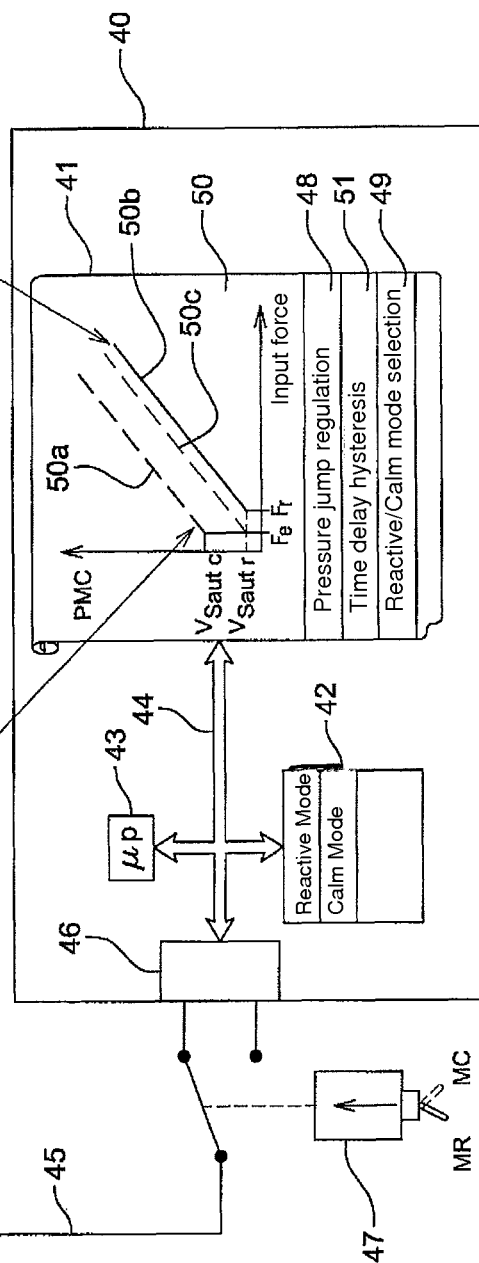

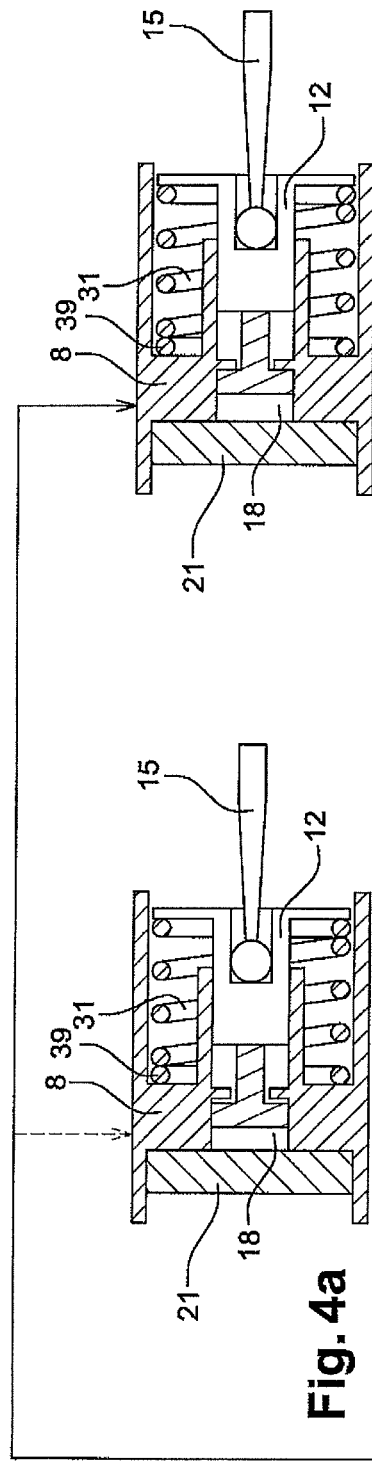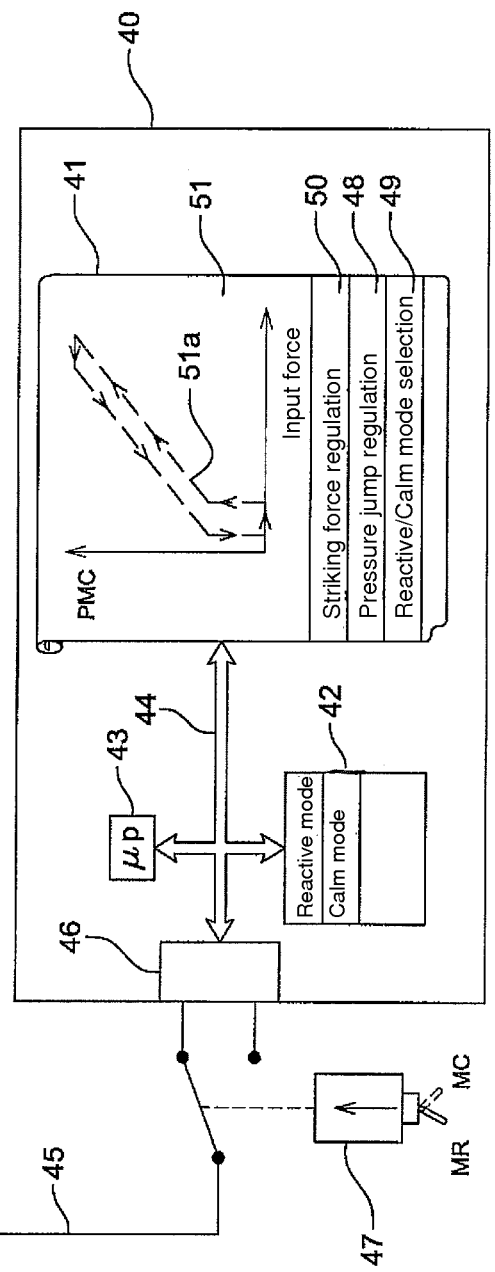

BRAKE ASSIST DEVICE AND MOTOR VEHICLE COMPRISING SUCH A DEVICE

FIELD OF THE INVENTION

The present invention relates to a brake-assist device for a motor vehicle. More specifically, the present invention is directed to an electric brake-assist servomotor for a motor vehicle.

BACKGROUND INFORMATION

In the current state of the art, a brake-assist device contains an electric servomotor having a ball-screw assembly that transforms a rotational movement of the ball forming the rotor of the electric motor into a translational movement of the screw that moves a moving part in the direction of a master cylinder. The servomotor is activated by a control rod moved by a brake pedal. A force sensor measures the force likely to be applied to the control rod by the driver through the brake pedal.

The pressure in the master cylinder changes as a function of the force exercised on the brake pedal, the so-called braking force.

Initially, the braking force is intended to overcome the resistance of a return spring of a plunger piston in rest position. When the servomotor is at rest, the pressure in the master cylinder remains constant. As the braking force increases, the resistance of the plunger piston return spring is overcome and the servomotor is activated. However, when the servomotor is in its rest position, axial play is present between the plunger piston, alone or equipped with a sensor, and the moving part. As a result, activation of the servomotor provokes a pressure jump in the master cylinder when there is constant force. It can be seen, therefore, that the greater the pressure increase in the master cylinder, the more the action on the brake pedal is felt as being effective by the driver.

Information about control rod travel is sent to a control unit, which, on the basis of this information, generates a command to the electric motor that moves the moving part in correspondence with the force exercised on the control rod.

The known device can be used to regulate axial play by varying the differential travel of the plunger piston with respect to the moving part as a function of the driver's driving mode.

There are, in practice, several categories of drivers. Some drive rather aggressively, and we can qualify this mode as sporty driving; others drive with greater restraint, and we can qualify this mode as relaxed driving. However, with a device such as that known to the state of the art, it is not possible to differentiate a braking force applied to the brake pedal by a driver who prefers a sporty driving mode from a driver who prefers a relaxed driving mode. This drawback is aggravated by the fact that a driver who prefers a relaxed driving mode must exert a force on the brake pedal similar to that of a driver who prefers a sporty driving mode to begin braking the vehicle, and vice versa.

SUMMARY

An object of the present invention, therefore, is to resolve these drawbacks in the state of the art. To do so, the present invention proposes an arrangement for modulating the value of the striking force as a function of the driver's driving mode, which is either preselected or determined on the basis of the vehicle's speed. In a conventional or electric brake booster, what is initially felt by the driver at the pedal is a striking force. The force on the pedal increases without braking up to a value that corresponds to a so-called brake jump phase. At the beginning of the jump phase, the brake booster goes into service. This places a booster plunger in contact, through a sensor, with a booster reaction disc. Then, with an additional, very slight, movement of the pedal, the brake booster gives rise to the movement of a master cylinder thrust rod that leads to a braking action. This brake force jump is realized by adjusting the difference between a position of the booster plunger and the master cylinder thrust rod. At this stage, the force felt by the driver is simply the force needed to compress a return spring separating the plunger from the thrust rod. Thus, according to the present invention, it is possible to define a specific striking force value for the driver who prefers a relaxed driving mode and a distinct striking force value for the driver who prefers a sporty driving mode. Additionally, in a vehicle equipped with a device according to the present invention, the striking force value can change dynamically during the same braking phase, allowing the driver to experience better feedback from the brake pedal. In particular, hysteresis is improved during the striking phase (known as a "jump").

An object of the present invention, therefore, is a brake assistance device for a motor vehicle having a servomotor, in which the servomotor has a plunger piston, a moving part, and an arrangement to move this moving part into position with respect to this plunger piston. The servomotor is activated by a control rod. The control rod has a first end that presses on the plunger piston and a second end to receive a force exercised by a brake pedal intended to be moved by a driver of the vehicle. The servomotor has a sensor situated in a contact space between the plunger piston and the moving part, and a spring compressed between the plunger piston and the moving part. The servomotor has an arrangement for moving the plunger piston in the contact space as a function of the driving mode. A stiffness of the spring is sufficiently high for the onset of braking to occur only with a striking force that is significantly higher during a reactive driving mode than it is during a calm driving mode.

The present invention also possesses any of the following traits:
  The significant difference, which is at least 50% greater as one moves from a reactive braking mode to a calm braking mode.
  A compressed spring that is compressed by a ball-screw assembly that transforms a rotational movement of the ball forming an electric motor rotor into a translational movement of the screw, the screw displacing the moving part and the spring resisting the coming together of the plunger piston and the moving part.
  A travel sensor placed at a longitudinal end of the spring.
  The onset of braking is produced by a lower striking force but with greater boost during calm mode than in reactive mode.
  A spring stiffness that is greater than or equal to 30 N/mm, that is, comprised between 11 and 22 N/mm.
  A sensor displacement arrangement in the contact space, as a function of the driving mode, having an arrangement for varying spring compression and a control unit having a microprocessor capable of executing a program for determining the compression that will be applied to the spring as a function of a driving mode selection via a data memory.
  An arrangement for detecting the movement of the plunger piston with respect to the moving part.

A sensor that moves freely.

A control unit that has a program to delay the return of the moving part to equilibrium position or the release of the brake pedal.

Another object of the present invention is a motor vehicle having a master cylinder activated by a brake pedal, an electric brake-assist servomotor placed between the master cylinder and the control rod, a servomotor control unit, brakes connected hydraulically to the master cylinder, characterized in that it has a booster device according to any one of the previous characteristics.

BRIEF DESCRIPTION OF THE DRAWINGS

FIG. 2a is a first schematic representation of the position of the plunger piston with respect to the moving part as a function of the driving mode of the driver of a vehicle equipped with a device according to the present invention.

FIG. 2b is a second schematic representation of the position of the plunger piston with respect to the moving part as a function of the driving mode of the driver of a vehicle equipped with a device according to the present invention.

FIG. 2c is a third schematic representation of the position of the plunger piston with respect to the moving part as a function of the driving mode of the driver of a vehicle equipped with a device according to the present invention. Further, FIG. 2c is a graphic representation of the outlet pressure of the master cylinder as a function of the force applied at the inlet on the control rod of a device according to the present invention.

FIG. 3a is a fourth schematic representation of the position of the plunger piston with respect to the moving part as a function of the driving mode of the driver of a vehicle equipped with a device according to the present invention.

FIG. 3b is a fifth schematic representation of the position of the plunger piston with respect to the moving part as a function of the driving mode of the driver of a vehicle equipped with a device according to the present invention.

FIG. 3c is a sixth schematic representation of the position of the plunger piston with respect to the moving part as a function of the driving mode of the driver of a vehicle equipped with a device according to the present invention. Further, FIG. 3c is a graphic representation of the outlet pressure of the master cylinder as a function of the force applied at the inlet on the control rod of a device according to the present invention.

FIG. 4a is a seventh schematic representation of the position of the plunger piston with respect to the moving part as a function of the driving mode of the driver of a vehicle equipped with a device according to the present invention.

FIG. 4b is an eighth schematic representation of the position of the plunger piston with respect to the moving part as a function of the driving mode of the driver of a vehicle equipped with a device according to the present invention.

FIG. 4c is a ninth schematic representation of the position of the plunger piston with respect to the moving part as a function of the driving mode of the driver of a vehicle equipped with a device according to the present invention. Further, FIG. 4c is a graphic representation of the outlet pressure of the master cylinder as a function of the force applied at the inlet on the control rod of a device according to the present invention.

DETAILED DESCRIPTION

Identical elements retain the same reference numbers from one figure to another.

Figure 1A:
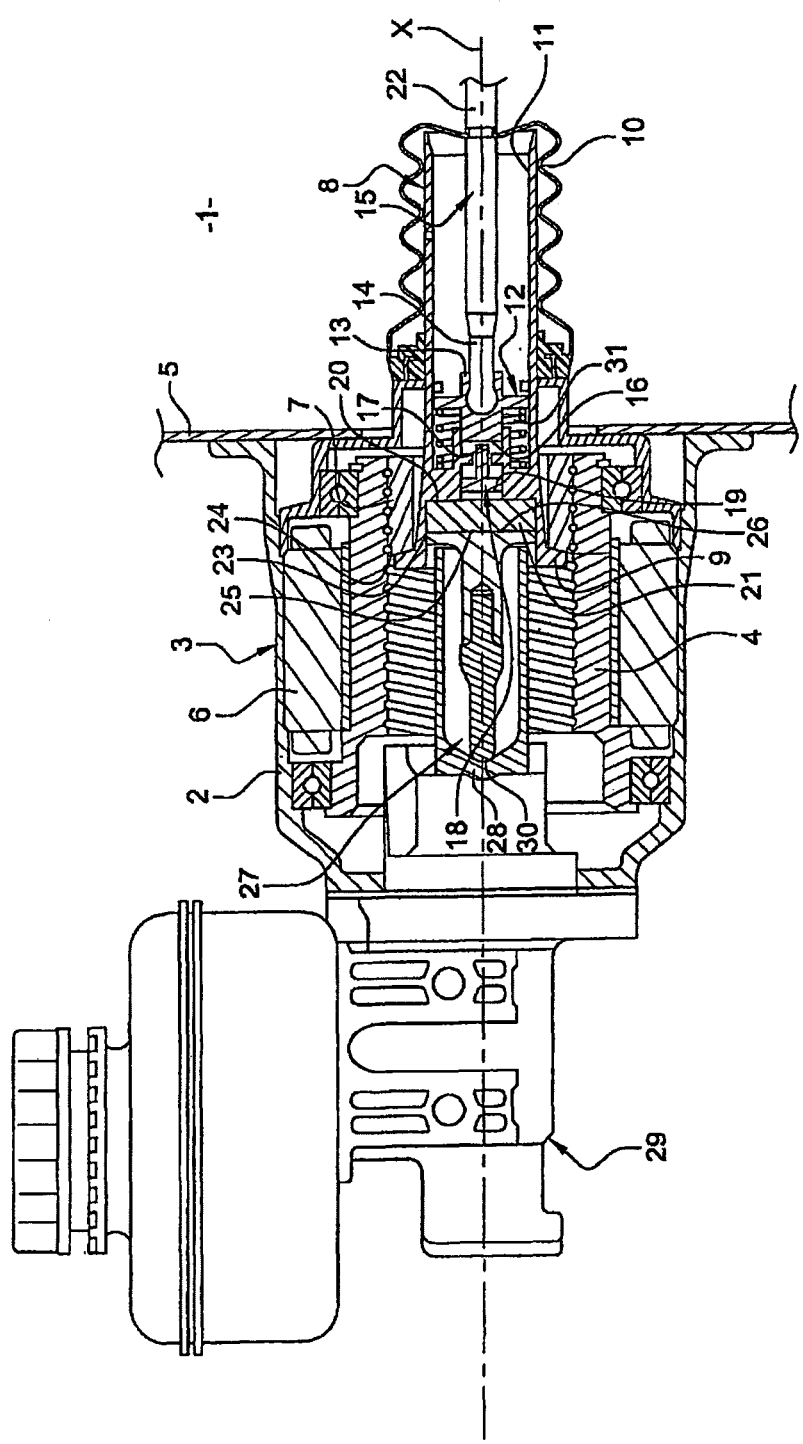
FIG. 1a is a first schematic representation of the device according to the present invention and a detail view of the moving part according to the present invention.

FIG. 1 illustrates electric brake-assist servomotor 1 according to the present invention, having body 2 forming the stator of electric motor 3 and rotor 4. Housing 2 of the servomotor is fixed to plate 5 separating an engine compartment from the passenger compartment of the motor vehicle.

Rotor 4 is configured so as to form the ball of a ball-screw assembly and rotate around an axis, X. Rotor 4 has winding 6 and is capable of translationally moving, as it rotates, a screw formed by annular ring 7.

Servomotor 1 also has moving part 8 on axis X fixedly mounted inside ring 7. Moving part 8 has first end 9 proximal to ring 7 and second end 10 distal to ring 7. Moving part 8 is crossed by longitudinal passage 11 in which plunger piston 12 slides.

Plunger piston 12 receives first rear end 13, first front end 14 of control rod 15, and is capable of coming into contact, by second front end 16, with first rear end 17, of sensor 18. Sensor 18 is capable of coming into contact, through second front end 19, with first face 20 of reaction disc 21. This reaction disc 21 is made of a material that is elastically deformable and incompressible, such as an elastomer.

Control rod 15 has second longitudinal rear end 22 connected to a brake pedal (not shown). This brake pedal can be moved by a driver of the motor vehicle equipped with a brake-assist device according to the present invention.

Reaction disc 21 is arranged in cavity 23 effected in front face 24 of moving part 8 in such a way that it rests, along the periphery of face 20, against moving part 8. Second face 25 of reaction disc 21 rests against first rear end 26 of thrust rod 27. This thrust rod 27 is intended to transmit the force of servomotor 1, which is an increasing function, affine, for example, of the force applied by the driver on the brake pedal. The force from thrust rod 27 is transmitted to piston 28 of master cylinder 29 by second front end 30.

When servomotor 1 is in rest position, axial play is provided between sensor 18 and a center part of face 20 of reaction disc 21. This play is used to establish the height of the pressure jump of servomotor 1. Moreover, the jump can be modified by the control program of the electric servomotor motor.

In the present invention, rest position means the inactive position of servomotor 1, that is, when the driver exerts no force on the brake pedal.

Servomotor 1 also has elastic element 31, which, in a preferred embodiment of the present invention, is a cylindrical return spring. This return spring 31 is compressed between moving part 8 and plunger piston 12. The term "compressed" corresponds to an initial tension exercised by plunger piston 12 and moving part 8 on spring 31. In this way, spring 31 prevents plunger piston 12 from coming together with moving part 8.

Figure 1B:
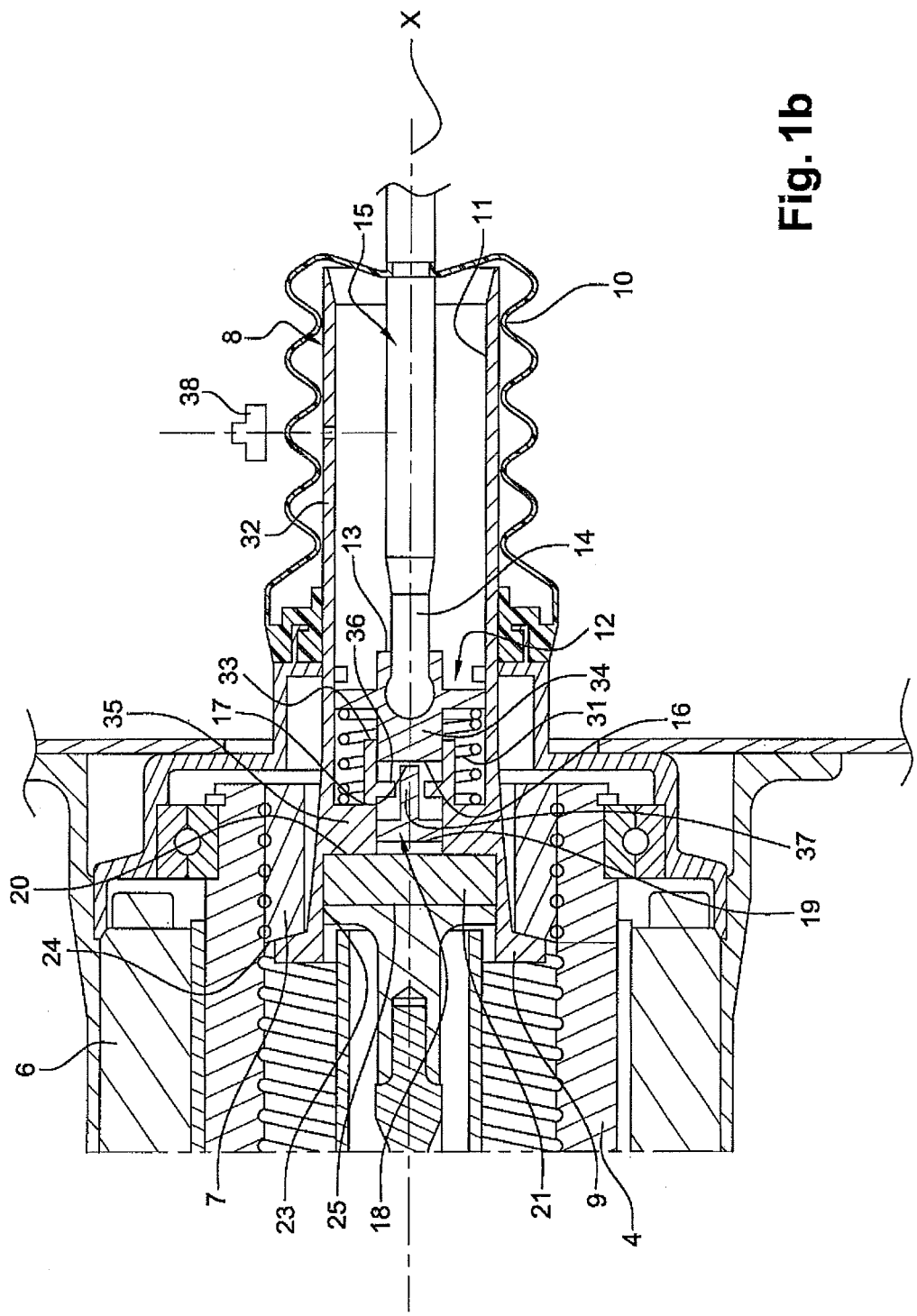
FIG. 1b is a second schematic representation of the device according to the present invention and a detail view of the moving part according to the present invention.

FIG. 1b is a detail view of moving part 8 according to the present invention. This figure shows that moving part 8 is formed from two concentric cylinders 32, 33 with respect to the X axis; first cylinder 32, known as the external cylinder, forming the body of moving part 8. This cylinder 32 has an internal diameter sufficient to allow plunger piston 12 to cross it in its entirety. Second cylinder 33, known as the internal cylinder, has an internal diameter sufficient to allow passage of head 34 of plunger piston 12. In the present invention, head 34 of plunger piston 12 is understood to mean the part of plunger piston 12 capable of being inserted into cylinder 33 of moving part 8. Internal cylinder 33 and external cylinder 32 of moving part 12 are connected to one another by circular ring 35 concentric to the two cylinders 32, 33. The space defined between cylinders 32, 33 forms a housing for receiving spring 31. Cylinder 33 has circular ring 36 on its internal face. This ring 36 has a central orifice capable of allowing tail 37 of sensor 18 to pass through. Sensor 18 moves between reaction disc 21 and ring 36, forming an end-of-travel stop for sensor 18.

In the present invention, element 38 for detecting the movement of moving part 8 and plunger piston 12 are provided. This detection can be used to control, by control unit 40, the action of electric motor 3 in order to displace moving part 8 in relation to plunger piston 12.

Servomotor 1 also has force sensor 39 placed on a longitudinal end of spring 31. Force sensor 39 is capable of detecting, for example, when at rest, a force value applied by spring 31 on moving part 8. The force value detected by force sensor 39 is sent to control unit 40, where it serves as reference value Vref.

In the present invention, the screw thread of the ball-screw assembly is reversible, in other words, the screw thread allows the screw to return to its rest position solely through the pressure contained in master cylinder 29 and the return springs (not shown) of the servomotor. Therefore, it is not necessary that rotor 4 be turned in the direction of rotation opposite the direction of rotation that moves ring 7 and moving part 8 in the direction of master cylinder 29. In this way, moving part 8 can return to rest position without activating electric motor 3.

In the present invention, the assembly formed by moving part 8 and ring 7 is configured in such a way that, should electric motor 3 or control unit 40 fail, the driver can exert a braking force that will be transmitted to master cylinder 29 without encountering obstacles formed by one of the parts of the ball-screw assembly.

Control unit 40 has program memory 41 and data memory 42 connected to microprocessor 43 via communications bus 44. Control unit 40 is connected to the different elements of the servomotor via another communications bus 45. The two communications buses are connected to one another by input/output interface 46. In an embodiment, the vehicle is equipped with external selector 47 that can be used to select a driving mode for the driver, reactive mode RM or calm mode, CM. In another embodiment, the control unit 40 alone determines the vehicle driving mode based on the vehicle speed during a predetermined period of prior and/or analogous braking types. The actions taken by control unit 40 are determined by microprocessor 43. In response to the instruction codes saved in program memory 41, the microprocessor produces commands intended for the various elements of servomotor 1 according to the present invention. Elements are understood to mean electric motor 3 as well as all the sensors 38, 39 associated with servomotor 1.

The operation of servomotor 1 according to the present invention will now be explained when the brake pedal is activated by the driver of the vehicle.

During a first phase, the driver wishes to activate the vehicle's brake pedal. He begins by applying force to the pedal, which force is transmitted by control rod 15 to plunger piston 12, then to sensor 18. During this first phase, no pressure appears in master cylinder 29.

During a second phase, the force on control rod 15 is equal to the load on spring 31; the travel sensor then detects a change in the relative position of control rod 15 and the thrust rod with respect to reference value Vref. Information concerning this change in relative position is sent to control unit 40. Control unit 40 then executes an instruction to control electric motor 3 in order to move moving part 8 by the ball-screw assembly in such a way that moving part 8 and plunger piston 12 each return to their respective rest position, known as equilibrium position. This second phase ends when sensor 18 comes in contact with reaction disc 21.

During a third phase, the thrust from sensor 18 in contact with the reaction disc results in an output pressure from servomotor 1 proportional to the input force applied to the brake pedal.

During a fourth phase, ring 7 achieves its maximum axial position with respect to rotor 4. In such a case, moving part 8 can no longer advance and only an additional force supplied by the driver to control rod 15 can be transmitted to master cylinder 29.

During a fifth and final phase, the driver partially or totally releases the brake pedal. In this case, control rod 15 is then pushed backward into its rest position. Spring 31 is then relaxed with respect to its rest position. Travel sensor 39 detects a change in the relative position of the thrust rod and control rod with respect to the reference value Vref. Control unit 40 analyzes this relative position value, determines that the latter is less than reference value Vref, determines that this is a return phase of servomotor 1 in rest position or in braking reduction position, and enables moving part 8 to withdraw so it can return to its equilibrium position with respect to plunger piston 12. Because the screw thread is reversible, pressure on the master cylinder and the return spring are sufficient to push ring 7 and moving part 8 backward to their rest position. Motor 3 then exerts a torque counter to the return of the moving part in order to maintain braking.

Control unit 40 allows the value of the pressure jump to be dynamically regulated 48 as a function of the selection of the driver's driving mode. Depending on the speed of the vehicle or a preselection made by the driver, control unit 40 determines 49 the driver's driving mode for a predetermined period of time. Whenever the driver selects a calm or relaxed driving mode (FIG. 2a), control unit 40 executes an instruction to control the rotation of rotor 4 in a direction such that moving part 8 is moved toward master cylinder 29. Whenever the driver selects a reactive or sporty driving mode (FIG. 2b), control unit 40 executes an instruction to control the rotation of rotor 4 in a direction such that moving part 8 moves toward control rod 15. The residual axial play between reaction disc 21 and sensor 18 and/or between sensor 18 and plunger piston 12 is adjusted by control unit 40 as a function of the values, identified by detection element 38, of the motion of moving part 8 and plunger piston 12. FIG. 2c is a graphical representation of program 48 for dynamically regulating the value of a pressure jump, Vsaut, based on the driving mode (reactive or calm) of the driver of the vehicle. This illustration shows the output pressure from master cylinder 29 as a function of the force applied to control rod 15 by the driver. In the illustration, it can be seen that control unit 40 controls the position of the moving part and, consequently, sensor 18, with respect to plunger piston 12, thereby determining a value, based on the driving mode, for the residual axial play between sensor 18 and reaction disc 21. Adjustment of this value of residual axial play can be used to dynamically adjust the height of the pressure jump Vsautr, Vsautc based on the driver's driving mode. In this way, when the driver's driving mode is calm, curve 48a, the pressure jump value, Vsautc, at the outlet of master cylinder 29 will be higher than the pressure jump value, Vsautr, when the driver's driving mode is reactive, curve 48b, for the same force applied to the brake pedal.

Control unit 40 also allows the value of the striking force to be dynamically regulated based on the vehicle driving mode. In other words, based on the vehicle's speed or a preselection for a predetermined period, control unit 40 modifies 50 the input force that needs to be applied to the brake pedal to obtain an initial pressure at the outlet of master cylinder 29. To accomplish this, the present invention provides for adjusting the compression of spring 31 by modifying the differential travel of the plunger piston with respect to the moving part as soon as the driver applies pressure to the brake pedal.

In the current state of the art, the stiffness of return spring 31 was very low. This stiffness was on the order of 3 N/mm. The state of the art required a small variation of force during the jump phase in the event of a change in the travel of the sensor with respect to the moving part due to an adjustment problem.

The present invention consists in replacing spring 31 used previously in the state of the art with spring 31 whose stiffness is sufficiently high to trigger the onset of braking only when the striking force is significantly higher during reactive driving mode than during calm driving mode. The spring stiffness is such that the significant difference is at least 50% greater during the transition from reactive braking mode (FIG. 3b) to calm braking mode (FIG. 3a).

With spring 31 according to the present invention, the onset of braking occurs with less striking force but with greater amplification during calm driving mode than during reactive driving mode. In the present invention, the stiffness of spring 31 is advantageously greater than or equal to 30 N/mm.

To that end, the present invention has an arrangement for the movement of sensor 18 within a contact space formed between reaction disc 21 and plunger piston 12 based on the driving mode. These displacement arrangements have an arrangement for varying the compression of spring 31 and control unit 40. Control unit 40 executes a program to determine the compression to be applied to the spring based on the selection of the driving mode via data memory 42. Whenever the selection of the driving mode is a calm or relaxed driving mode (FIG. 3a), control unit 40 executes an instruction to control the rotation of rotor 4 in a direction such that moving part 8 is moved toward master cylinder 29. The strike force in 3a to trigger the pressure jump is Fe. Whenever the selection of the driving mode is a reactive or sporty driving mode (FIG. 3b), control unit 40 executes an instruction to control the rotation of the rotor 4 in a direction such that moving part 8 is moved toward control rod 15. The strike force in 3b to trigger the pressure jump is Fr. With regard to the relative amount of input force, Fr is greater than Fe. The residual axial play between reaction disc 21 and sensor 18 and/or between sensor 18 and plunger piston 12 is adjusted by control unit 40 as a function of the values, identified by detection element 38, of the motion of moving part 8 and plunger piston 12. FIG. 3c is a graphical representation of program 50 for dynamically regulating the striking force based on the vehicle driving mode. This regulation is obtained by determining the compression to be applied to spring 31 as a function of the driving mode. In this way, when the driver's driving mode is reactive, curve 50b, the input force, Fr, associated with a first strike force is higher than the input force, Fe, associated with a second strike force when the driver's driving mode is calm.

As a result, because the stiffness of the spring is higher as the play between the reaction disc and the sensor element increases or decreases based on the driving mode of the driver, a significant and proportional variation in the striking force is implied. Thus, with the spring according to the present invention, it is possible to connect the over-assist period, in other words, the period during which there is an effective braking phase, with a striking force at the brake pedal. Curve 50a, associated with FIG. 3a, shows that the striking force is achieved for a force applied to the brake pedal that is smaller by half than that shown in curve 50b, associated with FIG. 3b. When the driver's driving mode is calm, the pressure jump, Vsautc, at the outlet of master cylinder 29 is shown in 50a as occurring at an input force of Fe. 50b depicts a curve, like curve 48b, where a same Fe implements the pressure jump value, Vsautr, at the outlet of master cylinder 29. 50c describes an embodiment in which the variation of the striking force from the play between the reaction disc and the sensor element implements the pressure jump, Vsautr, at the outlet of master cylinder 29 at an input force of Fr, which is greater than Fe.

FIG. 4c illustrates a hysteresis cycle shown by curve 51a. Through the use of a spring with higher stiffness, the hysteresis cycle is defined during a cyclical variation of the pressure at the master cylinder response to the force applied by the driver to the brake pedal. In effect, the stiffness of spring 31 creates a greater variation in force. In other words, the hysteresis cycle can be implemented during an ongoing braking pattern. For example, in FIG. 4a, servomotor 1 is illustrated in a brake-assist phase having a braking pattern in accordance with a calm driving mode. Following 4a, and in FIG. 4b, even though the driver partially releases the brake pedal the position of the moving part 8 remains essentially the same as the position as previously implemented in FIG. 4a. This hysteresis is due to a delay is generated by control unit 40. Control unit 40 has delayed the displacement of moving part 8 and held the moving part 8 in its equilibrium position, with respect to plunger piston 12. Spring 31, because of its stiffness, is then slightly relaxed, resulting in a decrease in the input force applied, thereby creating a hysteresis cycle. The invention also provides for better feedback at the brake pedal during the jump phase.

The invention claimed is:
1. A brake-assist device for a motor vehicle, comprising:
   a servomotor including:
      a plunger piston, and
      a moving part that moves into a position relative to the plunger piston;
   a control rod that activates the servomotor, wherein the control rod presses, at a first end, on the plunger piston, and receives, at a second end, a force exerted by a brake pedal, the force received being proportional to an origination force exerted by a driver of the vehicle;
   a component situated in the servomotor and in a contact space between the plunger piston and the moving part;
   a spring between the plunger piston and the moving part, the spring having a stiffness level and a compression; and
   an arrangement, situated in the servomotor, that, as a function of a driving mode, (i) varies the compression of the spring, (ii) displaces the plunger piston in the contact space, and (iii) displaces the component in the contact space, wherein the arrangement includes a control unit having a processing device configured to execute a program that determines, based on a selection of the driving mode, how the compression is varied, wherein a striking force that is returned to the driver at the brake pedal is based on the stiffness level and the compression of the spring, and wherein the stiffness level of the spring is selected such that when the driving mode is:
   a reactive driving mode, a braking is onset only when the striking force is at least of a first magnitude,
   a calm driving mode, the braking is onset only when the striking force is at least of a second magnitude that is lower than the first magnitude.

2. The device according to claim 1, wherein the stiffness level of the spring is between 11 and 22 N/mm.

3. The device according to claim 1, wherein, during a transition from the reactive braking mode to the calm driving mode, the first magnitude is at least 50% greater than the second magnitude.

4. The device according to claim 1, further comprising:
   a ball screw assembly for compressing the spring, the ball screw assembly transforming a rotational movement of a ball that forms a rotor of an electric motor into a translational movement of a screw, wherein the screw displaces the moving part and the spring resists a coming together of the plunger piston and the moving part.

5. The device according to claim 1, further comprising a force sensor placed at a longitudinal end of the spring.

6. The device according to claim 1, wherein the braking is supplemented during the calm driving mode with a second boost in the calm mode that exceeds a first boost, if any, provided in the reactive driving mode.

7. The device according to claim 1, wherein the stiffness level of the spring is greater than or equal to 30 N/mm.

8. The device according to claim 1, further comprising an arrangement that detects a displacement of the plunger piston relative to the moving part.

9. The device according to claim 1, wherein the component that is situated in the contact space is movable relative to at least one of: (i) the moving part and (ii) a reaction disc connected to a thrust rod of the servomotor.

10. The device according to claim 9, further comprising a movement sensor that detects at least one of: (i) a movement of the moving part, (ii) a movement of the plunger piston, and (iii) a movement of the moving part relative to the plunger piston.

11. The device according to claim 10, wherein residual axial play between at least one of: (i) the reaction disc and the component and (ii) the component and the plunger piston, is adjusted based on movement values detected by the movement sensor.

12. The device according to claim 1, wherein the control unit has a program to one of: (i) delay a return of the moving part to an equilibrium position and (ii) release the brake pedal.

13. The device according to claim 1, wherein the driving mode is one of: (i) preselected or (ii) determined based on a speed of the vehicle.

14. A motor vehicle, comprising:
a master cylinder actuated by a brake pedal;
an electric brake-assist servomotor between the master cylinder and a control rod;
a servomotor control unit;
brakes hydraulically connected to the master cylinder; and
a booster device that includes:
   the servomotor, wherein the servomotor includes:
      a plunger piston,
      a moving part that moves into a position relative to the plunger piston;
   the control rod that activates the servomotor, wherein the control rod presses, at a first end, on the plunger piston, and receives, at a second end, a force exerted by the brake pedal, the force received being proportional to an origination force exerted by a driver of the vehicle;
   a component situated in the servomotor and in a contact space between the plunger piston and the moving part;
   a spring between the plunger piston and the moving part, the spring having a stiffness level and a compression; and
   an arrangement, situated in the servomotor, that as a function of a driving mode, (i) varies the compression of the spring, (ii) displaces the plunger piston in the contact space, and (iii) displaces the component in the contact space, wherein the arrangement communicates with the servomotor control units to execute a program that determines, based on a selection of the driving mode, how the compression is varied,
   wherein a striking force that is returned to the driver at the brake pedal is based on the stiffness level and the compression of the spring, and wherein the stiffness level of the spring is selected such that when the driving mode is:
      a reactive driving mode, a braking is onset only when the striking force is at least of a first magnitude,
      a calm driving mode, the braking is onset only when a the striking force is at least of a second magnitude that is lower than the first magnitude.

15. The motor vehicle of claim 14, wherein, based on the selection of the driving mode, the control unit executes an instruction that controls a rotation of a rotor in a direction such that the moving part is moved towards the master cylinder.

16. The motor vehicle of claim 14, wherein, based on the selection of the driving mode, the control unit executes an instruction that controls a rotation of a rotor in a direction such that the moving part is moved toward the control rod.

17. The device according to claim 14, wherein the selection of the driving mode is provided by a data memory of the control unit.

* * * * *